United States Patent [19]

Gillette et al.

[11] Patent Number: 5,340,839
[45] Date of Patent: Aug. 23, 1994

[54] METHOD FOR SALVAGING ORGANIC THERMOPLASTIC VALUES FROM DISCARDED SURFACE TREATED ORGANIC THERMOPLASTIC SUBSTRATES

[75] Inventors: Gregory R. Gillette, Clifton Park, N.Y.; Popkin Shenian, Pittsfield, Mass.; Donald A. Bolon, Charlton; Patricia C. Irwin, Schenectady, both of N.Y.

[73] Assignee: General Electric Company, Schenectady, N.Y.

[21] Appl. No.: 981,668

[22] Filed: Nov. 25, 1992

Related U.S. Application Data

[63] Continuation-in-part of Ser. No. 949,928, Sep. 24, 1992.

[51] Int. Cl.$^5$ ............................................. C08J 11/04
[52] U.S. Cl. ..................................... 521/40; 521/40.5
[58] Field of Search ................................ 521/40, 40.5

[56] References Cited

U.S. PATENT DOCUMENTS

| | | | |
|---|---|---|---|
| 4,212,774 | 7/1980 | Idel | 521/40 |
| 4,602,046 | 7/1986 | Buser et al. | 521/46 |
| 4,619,706 | 10/1986 | Squires et al. | 134/2 |

FOREIGN PATENT DOCUMENTS

| | | | |
|---|---|---|---|
| 1934552 | 1/1976 | Fed. Rep. of Germany. | |
| 3511711A | 10/1986 | Fed. Rep. of Germany. | |
| 3511711 | 10/1986 | Fed. Rep. of Germany | 521/40 |
| 537567A2 | 4/1993 | Fed. Rep. of Germany. | |
| 475455A1 | 3/1992 | Japan. | |
| 1445168 | 8/1976 | United Kingdom. | |

OTHER PUBLICATIONS

Publication-Chemical Changes in Engineering Thermoplastics, D. A. Bolon and P. C. Irwin-Makromol. Chem. Marcromol. Symp. 57, pp. 227–234 (1992).

Based on information and belief, vapor deposited aluminum on polycarbonate in the form of compact disks have been processed with aqueous alkali hydroxide solutions to effect the removal of the vapor deposited aluminum from the surface of the polycarbonate more than one year prior to Sep. 24, 1992.–W. A. Teoli, Attorney of Record.

*Primary Examiner*—Paul R. Michl
*Assistant Examiner*—Olga Asinovsky
*Attorney, Agent, or Firm*—William A. Teoli; William H. Pittman

[57] ABSTRACT

A method is provided for salvaging organic thermoplastic values from discarded shaped organic thermoplastic substrate which has been surface treated with a protective or decorative organic coating can be salvaged and recycled. The discarded shaped organic thermoplastic substrate, such as a polycarbonate substrate can be granulated, treated with an aqueous alkaline solution which can contain a water miscible organic solvent, such as methanol and thereafter washed until neutral and dried.

11 Claims, No Drawings

METHOD FOR SALVAGING ORGANIC THERMOPLASTIC VALUES FROM DISCARDED SURFACE TREATED ORGANIC THERMOPLASTIC SUBSTRATES

CROSS REFERENCE TO RELATED APPLICATION

This application is a continuation-in-part of copending application Ser. No. 07/949,928, filed Sep. 24, 1992.

BACKGROUND OF THE INVENTION

The present invention relates to a method for recycling organic thermoplastic values, such as polycarbonate values from discarded organic thermoplastic substrates which have been surface treated with an organic or organosilicon material. More particularly, the present invention relates to a method for effecting the removal of a protective or decorative organic, or organosilicon coating including the removal of surface impregnated organic or organosilicon material, such as an organic UV stabilizer from various discarded organic thermoplastic substrates which can be in granular form, by treating the organic thermoplastic substrate with an aqueous alkaline solution, recovering the resulting treated organic thermoplastic substrate and thereafter washing and drying such organic thermoplastic substrate.

Organic thermoplastic substrates and particularly polycarbonate substrates are often used in glazing applications. Shaped organic thermoplastic substrates often employ a protective coating to preserve optical clarity and impact resistance. In applications not requiring optical clarity, organic thermoplastics nevertheless often use a protective coating to avoid scratch marks and/or to minimize environmental degradation, particularly if the organic thermoplastic substrate such as a polycarbonate article is used in outdoor applications.

One procedure used in treating polycarbonate sheet can involve the use of a silicone hardcoat (SHC), where the polycarbonate sheet is dipped into the hardcoat formulation and thereafter the treated polycarbonate sheet is dried followed by the thermal curing of the silicone resin. Additional protective coatings commonly used on polycarbonate articles are acrylic hardcoats and hardcoats based on formaldehyde-melamine resins (FMR). Other organic thermoplastics, such as a polymethylmethacrylate sheet can be initially treated with a thermoset acrylic primer followed by the application of a silicone hardcoat.

Organic thermoplastic end users and organic thermoplastic manufacturers such as found in the polycarbonate industry, have been faced with environmental concerns due to the build-up of discarded organic thermoplastic articles surface treated to improve scratch resistance and resistance to weathering. Surface treated organic thermoplastic articles often deteriorate after an extended period of time under atmospheric conditions, such as at least 6 months; scrap polycarbonate material also can be generated during the initial treatment of polycarbonate sheet with a silicone hardcoat formulation as a result of drips, runs, sags or dust inclusions which can mar the finish. The treated polycarbonate sheet is often discarded because it cannot be recycled. It is often disposed of by landfilling which can create environmental concerns.

Several studies have been made with respect to the removal of protective or decorative coatings from organic thermoplastics such as polycarbonates. Some of the procedures which have been used include, sandblasting, radio frequency heating, ice jet blasting, melt filtration, cryofracturing, high pressure water jet and grinding with wire brushes. Although such techniques have been found effective for removing hardcoat to a significant extent from the surface of various organic thermoplastic substrates, the resulting organic thermoplastic substrates in most instances, are often different in impact resistance and opacity as compared to the original virgin organic thermoplastic substrate. With respect to wire brushing, although effective in particular instances, it has been found limited to flat surface substrates having certain minimal dimension requirements.

It would be desirable therefore to provide a method which would allow salvaging of organic thermoplastic values, such as polycarbonate values, from surface treated polycarbonate articles, which normally would be discarded to minimize environmental concerns. It also would be desirable to be able to reclaim such organic thermoplastic values from such surface treated organic thermoplastic substrates to permit the direct blending of such salvaged values with virgin organic resin to provide organic thermoplastic articles having substantially the same optical clarity and impact resistance as parts made from the virgin resin.

SUMMARY OF THE INVENTION

The present invention is based on the discovery that organic thermoplastic substrates which have been surface treated with an organic or organosilicon coating can be recycled to salvage organic thermoplastic values. An aqueous alkaline solution at a slightly elevated temperature can be used, such as a temperature in the range of about 40° C. to about 100° C.; additionally, a water miscible organic solvent, such as methanol can be used in combination with such aqueous alkaline solution. Discarded organic thermoplastic articles, including materials, such as screen printed and sign grade thermoplastics which have been treated with a protective coating also can be directly treated. It has been found that improved results can be achieved if the organic thermoplastic articles are granulated prior to treatment with the aqueous alkaline solution. Aqueous alkaline solution treatment can be for a period of less than about an hour, while the resulting mixture is being agitated. The resulting treated organic thermoplastic articles or granules thereafter can be washed with water, which is preferably deionized, and then dried to produce a substantially restored or reconstituted organic thermoplastic substrate. It has been found that when the organic thermoplastic substrate, such as a polycarbonate substrate has been restored, the recovered polycarbonate product has been found to be substantially equivalent to virgin polycarbonate with respect to both optical transmission and Izod impact strength.

STATEMENT OF THE INVENTION

There is provided by the present invention, a method for salvaging organic thermoplastic values from a discarded organic thermoplastic substrate which has been surface treated with a decorative or protective organic or organosilicon coating, comprising, (1) effecting contact with agitation for a period of at least 20 minutes and at a temperature in the range of about 40° C. to about 100° C. between the surface treated organic thermoplastic substrate and an aqueous alkaline solution, (2) recovering the resulting organic thermoplastic substrate from (1), (3) washing the surface of the recovered organic thermoplastic substrate of (2) with an aqueous medium until the pH of the recovered aqueous wash medium is neutral, and (4) drying the resulting washed organic thermoplastic substrate.

Preferably, discarded organic thermoplastic substrates which can be surface treated in accordance with the method of the present invention are polycarbonate substrates, such as silicone hardcoat composites, shown by Patel, U.S. Pat. No. 5,041,313 and Olsen, U.S. Pat. No. 4,455,205 incorporated herein by reference. For example, a polycarbonate substrate can be initially primed with an acrylic primer followed by treatment with a silicone hardcoat composition, such as shown by Clark, U.S. Pat. No. 4,027,073 incorporated herein by reference, or another variation of a colloidal silica filled silicone composition as shown by U.S. Pat. No. 4,624,870 incorporated herein by reference. Additional discarded polycarbonate articles which have been surface treated with an organic material which can be treated in accordance with the practice of the method of the present invention are polycarbonate articles, such as polycarbonate sheets treated with a formaldehyde-melamine resin (FMR), or acrylic material such as a polymethylmethacrylate which can provide improved weathering resistance. Discarded thermoplastic substrates surface impregnated with organic ultraviolet radiation absorbers or stabilizers which can be salvaged in accordance with the practice of the invention are shown by Olson, U.S. Pat. Nos. 4,322,455 and 4,323,597, incorporated herein by reference.

Polycarbonate articles which can be salvaged in accordance with the practice of the present invention include materials formed from the phosgenation or transesterification of aromatic bisphenols, such as 2,2-bis-(2-hydroxyphenyl)propane having an intrinsic viscosity (IV) in chloroform of from 0.35 to 1.8 dl/g in chloroform Additional polycarbonate substrates which can be salvaged in accordance with the method of the present invention, can be made from aromatic bisphenols such as, 2,4'-dihydroxybiphenylmethane, bis-(2-hydroxyphenyl)methane, 2,2-bis-(4-hydroxyphenyl)propane, referred to hereinafter as "bisphenol A" or "BPA", 1,1-bis(4-hydroxyphenyl)ethane, 1,1-bis(4-hydroxyphenyl)propane, 4,4'-dihydroxybiphenyl, 4,4'-dihydroxy-3,3',5,5'-tetramethylbiphenyl, 2,4-dihydroxybenzophenone, 4,4'-dihydroxydiphenyl sulfone, 2,4'-dihydroxydiphenyl sulfone, 4,4'-dihydroxydiphenyl sulfoxide, 4,4'-dihydroxydiphenyl sulfide, tetramethylbisphenol A, 1,1-dichloro-2,2-bis(4-hydroxyphenyl)ethylene, 6,6'-dihydroxy-3,3,3',3'-tetramethylbis(1,1-spiroindane) (spirobiindane bisphenol),

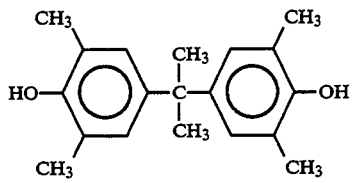

-continued

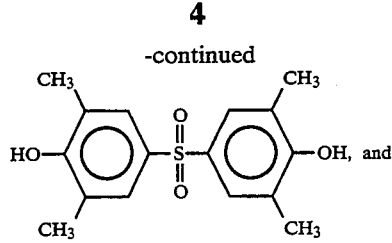

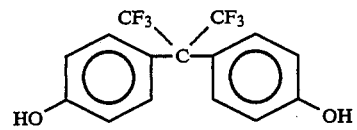

Copolycarbonates containing the above bisphenols as the major bisphenol constituents are also included. Also included are bisphenol-A poly(ester carbonate)s in which the bisphenol-A carbonate moieties are the major constituents.

Among the organic materials which are often used in the surface treatment of polycarbonates to impart improved surface properties thereto are acrylates which are shown in the Encylopedia of Polymer Science & Technology, Vol. 1, Interscience Publishers, John Wiley & Sons, Inc. (1964), page 246. For example, acrylic acid ester monomers can be used such as, methyl acrylate, isopropyl acrylate, n-propyl acrylate, n-butyl acrylate, isobutyl acrylate, secbutyl acrylate, 2-ethylhexyl acrylate, etc. Exemplary methacrylic acid ester monomers are for example, methyl methacrylate, ethyl methacrylate, n-butyl methacrylate, isobutyl methacrylate, hexyl methacrylate, etc. Copolymers of the above acrylate and/or methacrylate monomers are also useful in the surface treatment of polycarbonates.

In addition to discarded polycarbonate substrates, additional discarded organic thermoplastic substrates having a protective organic or organosilicon coating also can be treated in accordance with the practice of the invention, such as polymethylmethacrylates having a Mn of from about $10 \times 10^3$ to $500 \times 10^3$. There are also included discarded organic thermoplastic substrates having a protective organic or organosilicon coating, such as polyphenylene ethers, blends of polyphenylene ethers, aromatic polyester resins, polystyrenes, and ABS resins.

In the practice of the invention, the discarded surface treated organic thermoplastic substrate, which hereinafter preferably means a polycarbonate substrate, for example a sheet, a head lamp, or other molded article treated with a silicone hardcoat (SHC), a formaldehyde-melamine resin (FMR), or an acrylic coating, can be contacted with an aqueous alkaline solution, for example, having a pH of at least 12. Preferably, prior to contact with the aqueous alkaline solution, the surface treated organic thermoplastic substrate can be granulated utilizing a conventional grinder to produce a particulated material having an average diameter of about 1 centimeter or less. If desired, however, the intact surface treated organic thermoplastic substrate can be directly immersed in a rapidly agitated aqueous alkaline solution.

Methods for producing aqueous alkaline solutions having an effective pH range can be achieved by dissolving various alkaline materials in water at concentrations from 5% to 40%, and preferably 20% to 40% by weight of solution, such as hydroxides of alkali metals such as, lithium, cesium, rubidium, calcium, sodium, and potassium, and hydroxides of ammonium, or tetraalkylammonium, for example tetramethylammonium and tetrabutylammonium. Temperatures in the range of between about 40° C. to 100° C. can be employed while a preferred temperature is 45° C. to 60° C. The surface treated polycarbonate article can be exposed to the aqueous alkaline solution for a period of at least 20 min to 60 minutes and preferably at least 30 min to 60 min, employing an agitator, such as a stirrer to effect efficient contact with the organic or organosilicon coating on the polycarbonate surface.

In instances where the organic thermoplastic substrate is a polycarbonate substrate, it is preferred to employ in combination with the aqueous alkaline solution, a substantially inert water miscible organic solvent to facilitate removal of the organic or organosilicon hardcoat. In the absence of organic solvent, extended treatment times may be necessary, such as up to 4 hours or more which can be detrimental to the properties in the salvaged organic thermoplastic material. Organic cosolvent can be used in the range of about 5% to 95% by volume of the aqueous alkaline mixture and preferably 25% to 50% by volume.

Preferably, a water miscible organic solvent can be used as a cosolvent which includes solvents, such as a $C_{(1-4)}$ alkanol, for example methanol, ethanol, propanol, butanol and isopropanol, to facilitate the separation of the organic or organosilicon coating from the surface of the organic thermoplastic substrate as an upper layer in the treating solution.

In instances where a water miscible organic solvent is used, the separated organic or organosilicon coating can be readily skimmed from the treating solution prior to recovery of the intact polycarbonate article or if it is granulated, the resulting granules. After recovery of the treated polycarbonate, it can be dried at a temperature in the range of from 50° C. to 125° C. If the polycarbonate has been granulated, it can be injection molded to a specific shape.

In order that those skilled in the art will be better able to practice the present invention, the following examples are given by way of illustration and not by way of limitation. All parts are by weight.

EXAMPLE 1

Several 1"×2"×⅛" Lexan ® polycarbonate panels which had been coated with a silicone hardcoat formulation as shown by Clark, U.S. Pat. No. 4,027,073, were immersed in a treating solution consisting of equal volumes of methanol and an aqueous sodium hydroxide solution having 20% sodium hydroxide by weight. While the polycarbonate panels were immersed, the treating solution, which was at 50° C., was continuously agitated with a stirrer. After being immersed for 30 minutes, the polycarbonate panels were washed with water and dried. The same procedure was repeated except that polycarbonate panels were used which had been coated with a formaldehyde-melamine hardcoat. The dried polycarbonate panels were ground to ¼" pellets and, then injection molded into several test samples. The test samples were evaluated for MW, and % transmission, color (yellow index "YI"), and haze, using a Gardner haze meter and notched Izod impact (NI). The results were compared with test panels prepared by injection molding virgin Lexan ® polycarbonate or "virgin PC". The following results were obtained, where "treated PC" means polycarbonate panels which had been coated with a silicone hardcoat, or a formaldehyde-melamine hardcoat, and then immersed in the treating solution of the present invention:

TABLE 1

|  | MW | % T | YI | HAZE | NI (lbs./in) |
|---|---|---|---|---|---|
| treated PC | 40,000 | 86.0 | 3.50 | 4.0 | 17.1 |
| virgin PC | 43,000 | 83.8 | 0.70 | 3.1 | 16.8 |

The above results show that the polycarbonate values treated in accordance with the practice of the method of the present invention (treated PC) were substantially equivalent to virgin polycarbonate.

EXAMPLE 2

A 35 pound sample of an 85:15 mixture of granulated silicone hardcoated polycarbonate and granulated formaldehyde-melamine hardcoated polycarbonate was added to 25 gallons of an equal volume % solution of aqueous sodium hydroxide having 20% by weight of sodium hydroxide and methanol. The solution had been pre-warmed to 50° C. The resulting slurry was stirred for 30 minutes and then was allowed to cool to room temperature. The solution was decanted from the solid and the solid was washed with water until it had a neutral pH. The resulting granulated polycarbonate was then centrifuged and then dried for 12 hours at 125° C. in a vacuum oven. The dried granulated polycarbonate was analyzed for silicon by elemental analysis. The following shows the silicon content in ppm of silicon of the initial hardcoated polycarbonate, "hardcoated", and the dried granulated polycarbonate obtained from the hardcoated polycarbonate after treatment in accordance with the invention, "treated":

TABLE 2

|  | Si (ppm) |
|---|---|
| treated | 1.3 |
| hardcoated | 616 |

The above results show that the method of the invention can effect a substantial removal of the silicone hardcoat from the surface of the polycarbonate granules.

The treated and hardcoated polycarbonate were then injection molded into ½"×2½"×⅛" test slabs and evaluated for Notched Izod (ASTM D256), Tensile Strength (ASTM D638) and Haze (ASTM D1003). The following results were obtained where the treated and hardcoated slabs as previously defined, are further compared to slabs made from virgin polycarbonate, or previously unused polycarbonate material:

|  | Notched Izod (ft-lb/in) | Break Type |
|---|---|---|
| virgin | 17.8 (0.54)* | Hinge |
| hardcoated | 6.3 (5.9) | 3 Hinge/7 Brittle |
| treated | 18.0 (0.87) | Hinge |

| | Tensile Properties | | |
|---|---|---|---|
|  | Modulus | Yield Strength (psi) | % Elongation to Break |
| virgin | 341(14) | 9175(20) | 193(5) |
| hardcoated | 351(16) | 9200(34) | 86(45) |
| treated | 345(13) | 9250(31) | 186(8) |

| | Haze | | |
|---|---|---|---|
|  | Transmittance | YI | Haze |
| virgin | 87.8 | 1.7 | 1.3 |

| -continued | | | |
|---|---|---|---|
| hardcoated | 72.4 | 10.6 | 95.0 |
| treated | 89.1 | 1.5 | 1.6 |

*Standard deviation

The above results show that polycarbonate treated in accordance with the invention is substantially equivalent to virgin polycarbonate.

EXAMPLE 3

Polycarbonate panels (1"×2"×⅛") which had been hardcoated in accordance with the method of Clark, U.S. Pat. No. 4,027,073, were treated in accordance with the method of Example 1 utilizing a 50% by volume methanol aqueous ammonium hydroxide solution. The concentration of the ammonium hydroxide was varied to provide a pH in the range of from 10-12. The polycarbonate panels were treated at 50° C. for a period of from 15 minutes to 60 minutes. The following results were obtained, where "NR" means the hardcoat was not totally removed. This was indicated by a subsequent methylene chloride rub test showing a haze-free surface. "TR" means that the hardcoat was totally removed which was shown by the formation of a hazy surface after the methylene chloride treatment. The following results were obtained:

TABLE 3

| | Time (min) at 50° C. | | | |
|---|---|---|---|---|
| pH | 15 | 30 | 45 | 60 |
| 10 | NR | NR | NR | NR |
| 11 | NR | NR | NR | NR |
| 12 | NR | TR | TR | TR |

The above results show that pH and time of exposure to the treating solution are significant factors in effecting hardcoat removal.

EXAMPLE 4

The procedure of Example 3 was repeated utilizing silicone hardcoat treated polycarbonate panels which were contacted with a solution of equal volumes of methanol and sodium hydroxide at a 20% by weight concentration sufficient to provide a pH of 13.9. The time of treatment varied between 15 minutes to 60 minutes and the temperature of the treating solution was varied between 23° C. to 50° C. The following results were obtained, where NR means that the polycarbonate surface failed the methylene chloride haze test, while TR means it passed, as defined in Example 3:

TABLE 4

| Temp. | Time (min) | | | |
|---|---|---|---|---|
| (°C.) | 15 | 30 | 45 | 60 |
| 23 | NR | NR | NR | NR |
| 40 | NR | NR | NR | TR |
| 50 | NR | TR | TR | TR |

The above results show that a temperature of at least 40° C. is effective for removal of the silicone hardcoat as shown by the methylene chloride haze test. However at a temperature of 50° C., the time of treatment required for effective treatment is significantly less.

In addition to the above results, various materials capable of providing a pH of at least 12 and capable of generating counter ions, such as sodium, potassium, ammonium and tetrabutylammonium were found to be substantially equivalent with respect to their effectiveness for removing silicone hardcoat at a temperature of 50° C. over a period of from 15 minutes to 60 minutes.

EXAMPLE 5

A solution of 10.0 g of NaOH, 50 mL of distilled water and 50 mL of methanol is added to a 250 mL beaker. The temperature is raised to 50° C. Four 1"×2"×⅛" polycarbonate panels which are coated with a hexane diol diacrylate acrylic hardcoating are added to the solution; the beaker is covered. A polycarbonate panel is removed every 15 minutes over a 1 hour period. Analysis of the treated polycarbonate by ATR-IR spectroscopy shows that panels treated 30 minutes or longer are free of the acrylic coating. GPC analysis of the recovered polycarbonate also shows that the polycarbonate has not suffered loss of molecular weight during the treatment.

EXAMPLE 6

Several aqueous alkaline treating solutions were prepared by mixing equal volumes of various miscible organic solvents with an aqueous solution of sodium hydroxide at pH 13.9. Polycarbonate panels, as shown in Example 1, were respectively immersed in the treating solution at 56° C. for a period of from 40 min to 70 min in accordance with the conditions of Example 1. After exposure, the panels were evaluated for hardcoat removal using the methylene chloride rub test of Example 3. The following results were obtained, where "NR" means not totally removed and "TR" means totally removed:

TABLE 5

| | Time (min) | | | |
|---|---|---|---|---|
| solvent | 40 | 50 | 60 | 70 |
| CH₃OH | NR | TR | TR | TR |
| C₂H₅OH | NR | TR | TR | TR |
| IPA | NR | NR | NR | TR |
| Dowanol PM | NR | NR | NR | TR |
| ethylene glycol | NR | NR | NR | NR |
| no solvent | NR | NR | NR | NR |

NR = Not totally removed as shown by CH₂Cl₂ rub test
TR = Totally removed
IPA - Isopropyl Alcohol

EXAMPLE 7

A ⅛ thick polymethylmethacrylate sheet, Acrylite 240, of the Cyro Corporation of South Lake, Tex., was primed with an acrylic primer in the form of polymethylmethacrylate emulsion thermoset which was cured at 90° C. for 3 hours, and recoated with a solution of a silicone hardcoat AS4000, of the GE Silicone Products Division. The silicone hardcoat was cured at 90° C. for 3 hours. The cured coating was resistant to steel wool and passed a scribed adhesion tape pull test. Four 1"×2" test slabs were cut from this sheet and were placed into an aqueous alkaline bath which was prepared as follows:

A solution of 10.0 g of NaOH, 50 mL of distilled water and 50 mL of methanol was added to a 250 mL beaker. The temperature of the bath was maintained at 50° C.

The treated Acrylite 240 test slabs were removed at 15, 30, 45, and 60 minute intervals. It was found that the primer coating as shown by ATR-IR had been completely removed about 30 minutes in the bath.

EXAMPLE 8

A 4"×6"×⅛" polycarbonate panel was coated with silicone hardcoat AS4000, of the GE Silicone Products Division, and cured. The coated panel was then exposed to ultraviolet light in a QUVB weatherometer for 5200 hours which is approximately equivalent to 5 years exposure in South Florida. Four ½"×2"×⅛" slabs were cut from the panel. Three slabs were immersed in a bath made from 50 mL of isopropyl alcohol and 50 mL of a 20 wt % aqueous solution of NaOH. The bath temperature was maintained at 80° C. After 25-75 minutes in the bath, the treated slabs were washed until the wash water had a neutral pH. The slabs were then dried in a vacuum oven.

The following table shows a comparison of the optical properties with respect to YI and Haze as defined in Example 3 between the treated slabs and similiar virgin polycarbonate slabs:

TABLE 6

| Sample | Bath Time (min) | YI | Haze |
| --- | --- | --- | --- |
| virgin PC | 0 | 1.7 | 1.3 |
| weathered PC | 0 | 6.5 | 4.3 |
| weathered PC | 25 | 0.0 | 2.0 |
| weathered PC | 50 | 0.0 | 3.0 |
| weathered PC | 75 | 0.0 | 4.8 |

EXAMPLE 9

There were cut three ½"×2"×¼" slabs from a 4"×6"×¼" polycarbonate panel which had been surface impregnated with the organic UV stabilizer Tinuvin 1130, (Ciba Geigy) and exposed in South Florida for 3.5 years. Two slabs were placed into a treating bath which consisted of 50 mL of isopropyl alcohol and 50 mL of 20 wt % aqueous NaOH solution. The bath temperature was maintained at 82° C. After 30-60 minutes in the bath, the slabs were washed and dried as in Example 8. The following results show an optical comparison between the treated slabs and similiar virgin polycarbonate slabs following the procedure of Example 8:

TABLE 7

| Sample | Bath Time (min) | YI | Haze |
| --- | --- | --- | --- |
| virgin PC | 0 | 1.7 | 1.3 |
| weathered SIPC | 0 | 2.3 | 5.5 |
| weathered SIPC | 30 | 0.0 | 12.2 |
| weathered SIPC | 60 | 0.0 | 10.2 |

SIPC - Surface Impregnated Polycarbonate

EXAMPLE 10

Six 1"×4"×⅛" silicone hardcoated polycarbonate plaques were immersed in an aqueous alkaline solution of 80 g of NaOH in 400 mL of water which provided an initial pH at 13.8. The temperature of the solution was raised and maintained at 80° C. The plaques were examined after five minute intervals until it was determined by the $CH_2Cl_2$ rub test that the hardcoat had been completely removed.

The same procedure was repeated except that the concentration of the NaOH in solution was varied between 20 to 80 grams. The following table shows the removal time, % haze and the pH of the alkaline solution before and after stripping:

TABLE 8

STRIPPING OF MR5 HARDCOATED LEXAN WITH $NaOH/H_2O$ AT 80° C.

| # of Grams NaOH added to 400 mL $H_2O$ | Time of Removal of coating | % Haze | pH of Stripping Soln Before | pH of Stripping Soln After |
| --- | --- | --- | --- | --- |
| 80.0 | 30 min | 1.2 | 13.8 | 13.7 |
| 70.0 | 40 min | 1.4 | 13.7 | 13.7 |
| 60.0 | 55 min | 1.6 | 13.7 | 13.7 |
| 50.0 | 90 min | 3.0 | 13.8 | 13.7 |
| 40.0 | 135 min | 5.7 | 13.8 | 13.7 |
| 30.0 | 4 hrs | 11.8 | 13.7 | 13.7 |
| 20.0 | 7 hrs | 29.6 | 13.6 | 13.7 |

The above data demonstrate that there is a strong dependence between coating removal rate and the NaOH concentration. At lower concentrations, an increase in exposure of the polycarbonate to the caustic medium, and degradation of the polycarbonate results. Surface degradation can be observed by measuring the percent haze formation. Increasing exposure time leads to increased haze formation and therefore polycarbonate degradation.

Although the above examples are directed to only a few of the very many variables which can be employed in the practice of the method of the present invention, it should be understood that the method of the present invention is directed to procedures utilizing a much broader variety of treated organic thermoplastic substrates, and conditions and materials for effecting the removal of such treated substrates, as set forth in the description preceding these examples.

What is claimed is:

1. A method for effecting the removal of the surface coating on a discarded organic thermoplastic substrate which has been surface treated with a decorative or protective organic or organosilicon coating, comprising, (1) effecting contact with agitation for a period of at least 20 minutes and at a temperature in the range of about 40° C. to about 100° C. between the surface treated organic thermoplastic substrate and an aqueous alkaline solution having a $C_{(1-4)}$ alkanol cosolvent and a pH of at least 12, (2) recovering the resulting organic thermoplastic substrate directly from (1), (3) washing the surface of the recovered organic thermoplastic substrate of (2) with an aqueous medium until the pH of the recovered aqueous wash medium is neutral, and (4) drying the resulting organic thermoplastic substrate.

2. A method in accordance with claim 1, where the discarded organic thermoplastic substrate is granulated.

3. A method in accordance with claim 1, where the discarded organic thermoplastic substrate is a polycarbonate substrate.

4. A method in accordance with claim 1 where the $C_{(1-4)}$ alkanol cosolvent is methanol.

5. A method in accordance with claim 1, where the discarded organic thermoplastic substrate is polymethylmethacrylate.

6. A method in accordance with claim 1, where sodium hydroxide is used to maintain the pH of the aqueous treating solution.

7. A method in accordance with claim 1, where organic thermoplastic values are salvaged from an organic